(12) United States Patent
Runte

(10) Patent No.: US 9,617,025 B2
(45) Date of Patent: Apr. 11, 2017

(54) PACKAGING MACHINE HAVING AN EXCHANGEABLE TOOL

(71) Applicant: GEA Food Solutions Germany GmbH, Biedenkopf-Wallau (DE)

(72) Inventor: Frank Runte, Bad Laasphe (DE)

(73) Assignee: GEA Food Solutions Germany GmbH, Biedenkopf-Wallau (DE)

( * ) Notice: Subject to any disclaimer, the term of this patent is extended or adjusted under 35 U.S.C. 154(b) by 408 days.

(21) Appl. No.: 14/380,098

(22) PCT Filed: Feb. 28, 2013

(86) PCT No.: PCT/EP2013/054103
§ 371 (c)(1),
(2) Date: Aug. 21, 2014

(87) PCT Pub. No.: WO2013/127963
PCT Pub. Date: Sep. 6, 2013

(65) Prior Publication Data
US 2015/0027090 A1    Jan. 29, 2015

(30) Foreign Application Priority Data
Feb. 29, 2012    (DE) .................. 10 2012 003 830

(51) Int. Cl.
*B26D 7/26*    (2006.01)
*B29C 33/30*    (2006.01)
(Continued)

(52) U.S. Cl.
CPC .............. *B65B 59/04* (2013.01); *B26D 7/26* (2013.01); *B29C 33/305* (2013.01);
(Continued)

(58) Field of Classification Search
CPC ........... B65B 59/04; B65B 9/04; B65B 61/06; B26D 7/26; B29C 33/30; B29C 51/18; B29C 51/30
(Continued)

(56) References Cited

U.S. PATENT DOCUMENTS 3,559,522 A * 2/1971 Valente ................. B21D 37/14
                                                        100/224
3,767,349 A * 10/1973 Jezuit ...................... B29C 51/06
                                                        425/289
(Continued)

FOREIGN PATENT DOCUMENTS

DE        9010832 U1    9/1990
DE        9017161 U1    2/1991
(Continued)

OTHER PUBLICATIONS

International Preliminary Report on Patentability, Application No. PCT/EP2013/054103 dated Feb. 11, 2014.
(Continued)

*Primary Examiner* — Andrew M Tecco
*Assistant Examiner* — Praachi M Pathak
(74) *Attorney, Agent, or Firm* — The Dobrusin Law Firm, P.C.; Daniel Aleksynas

(57) ABSTRACT

The present invention relates to a packaging machine having a thermoforming station, a sealing station and/or a cutting device, wherein at least one of said stations or the cutting device have a lifting table having a lifting device.

9 Claims, 2 Drawing Sheets

(51) Int. Cl.
  *B29C 51/18* (2006.01)
  *B29C 51/30* (2006.01)
  *B65B 59/04* (2006.01)
  *B29C 51/20* (2006.01)
  *B29C 33/34* (2006.01)
  *B65B 61/06* (2006.01)
  *B65B 9/04* (2006.01)
  *B29C 65/00* (2006.01)

(52) U.S. Cl.
  CPC .......... *B29C 33/306* (2013.01); *B29C 51/18* (2013.01); *B29C 51/30* (2013.01); *B65B 9/04* (2013.01); *B65B 61/06* (2013.01); *B26D 2007/2607* (2013.01); *B29C 66/112* (2013.01); *B29C 66/131* (2013.01); *B29C 66/53461* (2013.01); *B29C 66/8167* (2013.01); *Y10T 29/49826* (2015.01)

(58) Field of Classification Search
  USPC .............................. 53/559, 561, 392.2–392.5
  See application file for complete search history.

(56) References Cited

U.S. PATENT DOCUMENTS

| | | | |
|---|---|---|---|
| 3,841,141 A * | 10/1974 | Rachwal | B21D 37/14 100/918 |
| 3,942,299 A | 3/1976 | Bory | |
| 4,152,978 A * | 5/1979 | Abe | B21D 37/145 100/229 R |
| 4,684,025 A | 8/1987 | Copland et al. | |
| 4,773,839 A * | 9/1988 | Case | B23Q 1/0063 100/214 |
| 4,819,406 A | 4/1989 | Redmond | |
| 5,408,804 A | 4/1995 | Schroder | |
| 5,458,057 A * | 10/1995 | Arens | B23D 35/002 100/229 R |
| 5,619,913 A * | 4/1997 | Padovani | B29C 31/006 100/215 |
| 6,200,245 B1 * | 3/2001 | Dodo | B21B 15/0042 100/229 R |
| 6,334,290 B1 | 1/2002 | Reichert et al. | |
| 7,313,900 B2 | 1/2008 | Granilli | |
| 7,703,265 B2 * | 4/2010 | Bonneville | B65B 41/14 53/453 |
| 8,028,504 B2 * | 10/2011 | Zeller | B65B 59/04 53/453 |
| 8,499,536 B2 * | 8/2013 | Bonneville | B65B 9/04 53/559 |
| 2001/0029225 A1 * | 10/2001 | Kawamoto | B21D 37/14 483/29 |
| 2002/0100257 A1 * | 8/2002 | Nakamura | B65B 9/045 53/559 |
| 2009/0100804 A1 * | 4/2009 | Bonneville | B65B 41/14 53/453 |
| 2009/0301658 A1 * | 12/2009 | Vine | B65B 7/164 156/497 |
| 2010/0024359 A1 | 2/2010 | Feisel | |
| 2010/0287888 A1 * | 11/2010 | Shackelford | B65B 47/04 53/453 |
| 2011/0024439 A1 | 2/2011 | Send et al. | |
| 2012/0291400 A1 * | 11/2012 | Ehrmann | B65B 9/04 53/396 |
| 2013/0212988 A1 * | 8/2013 | Schmeiser | B65B 7/164 53/558 |
| 2013/0308996 A1 * | 11/2013 | Rodi | B29C 51/264 403/27 |
| 2015/0027090 A1 * | 1/2015 | Runte | B29C 33/305 53/559 |

FOREIGN PATENT DOCUMENTS

| | | |
|---|---|---|
| DE | 10359478 A | 7/2005 |
| DE | 10201009536 A1 | 9/2011 |
| EP | 0084442 B1 | 7/1983 |
| EP | 0489797 B1 | 1/1996 |
| EP | 2052979 A1 | 4/2009 |
| WO | 2007/063741 A1 | 6/2007 |
| WO | 2009/083200 A1 | 7/2009 |

OTHER PUBLICATIONS

International Search Report, Application No. PCT/EP2013/054103 dated Jul. 2, 2013.
German Search Report, Application No. 102012003830.5 dated Apr. 16, 2012.

* cited by examiner

PACKAGING MACHINE HAVING AN EXCHANGEABLE TOOL

The present invention relates to a packaging machine having a thermoforming station and/or a sealing station and/or a cutting device, wherein at least one of these stations or the cutting device has a lifting table with a lifting device.

Such packaging machines are known from the prior art and are usually referred to as "form-fill-seal packaging machines" (FFS packaging machines). These are preferably thermoforming machines. A multiplicity of different packs in different formats are produced in such packaging machines. For this purpose, it is necessary to change over tools, same of which are of a considerable weight, and this usually required very high outlay in the case of packaging machines according to the prior art.

For some time now, there has therefore been a need to provide a packaging machine in which the tool changeover can be carried out more quickly and/or easily.

The object is achieved by a packaging machine having a thermoforming station, a sealing station and/or a cutting device, wherein at least one of these stations or the cutting device has a tool and an upper part and the tool can be fastened in a reversible manner on the upper part and the tool or the upper part has a guide, along which the tool can be introduced into the upper part in the first instance essentially horizontally and which then raises the tool.

The present invention relates to a packaging machine for packaging an article in a plastic sheet material. The pack usually has a thermoformed pack cavity, which is filled with the article sad then closed by a cover, in particular a cover sheet material. The cover is usually sealed onto the pack cavity. Gas exchange can take place in the pack cavity prior to the sealing operation. The cover sheet material may likewise be thermoformed.

It is usually the case that the pack cavities are formed in a planar sheet-material web in a thermoforming station. This sheet-material web is transported along the packaging machine, preferably cyclically, in particular by way of chains. Thereafter, the pack cavity is filled and then closed by a cover sheet material in a sealing station. The pack completed in this way is then separated in a cutting device.

According to the invention, at least one station has an upper part and a tool which is fastened on the upper part. The tool can optionally be changed over. For this purpose, the tool has to foe removed from the upper part.

According to the invention, then, either the tool or the upper part has a guide, along which the tool can be introduced into the upper part in the first instance essentially horizontally and which then raises the tool. As a result, the tool can be introduced into the upper part in the first instance essentially horizontally and raised in the final section, this reducing the distance between the upper part and the tool. For removal purposes, the tool is in the first instance lowered and then pulled out of the upper part essentially horizontally.

The guide, for example a guide track, preferably has a first slope and a second slope and a horizontal portion located therebetween. The tool is pushed into the upper part in the first instance along the horizontal portion and its front and its rear end are then raised by the first and second slope, respectively.

The tool further preferably has at least one first rolling or sliding means and at least one second roiling or sliding means. These means are preferably provided on two opposite sides of the tool and particularly preferably in each case in. the region of the front and rear ends of the same.

The packaging machine preferably has a first rolling or sliding surface, for example the surface of the frame of the packaging machine and/or the surface of the chain guide, along which the tool can be displaced. It is preferable here for the first roiling or sliding means to interact with the rolling or sliding surface. It is further preferable for the second roiling or sliding meats to interact with the guide.

The present invention also relates to a method of introducing a tool into an upper part,- wherein the tool is displaced in the first instance along a rolling or sliding surface, in particular horizontally, and then along a guide, which raises the tool in the final portion.

The invention will be explained hereinbelow with reference to FIGS. 1-6. These explanations are merely by way of example and do not limit the general concept of the invention.

Figure 1:
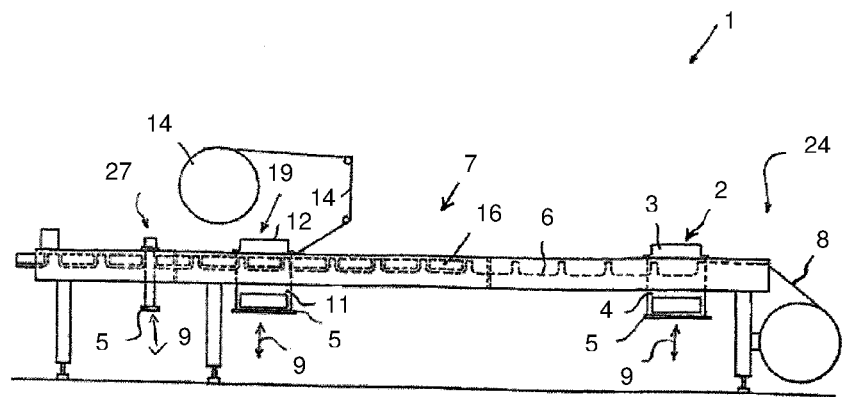
FIG. 1 shows the packaging machine according to the invention.
Figure 2:
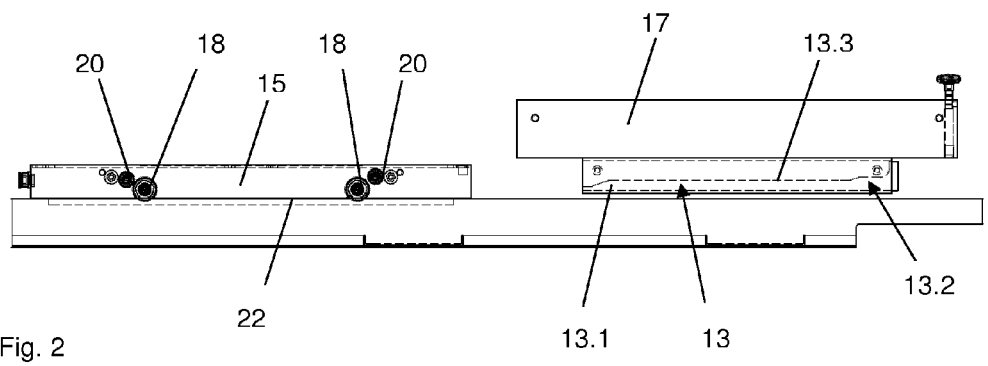
FIGS. 2-5 show the operation of introducing the tool into the upper part.
Figure 3:
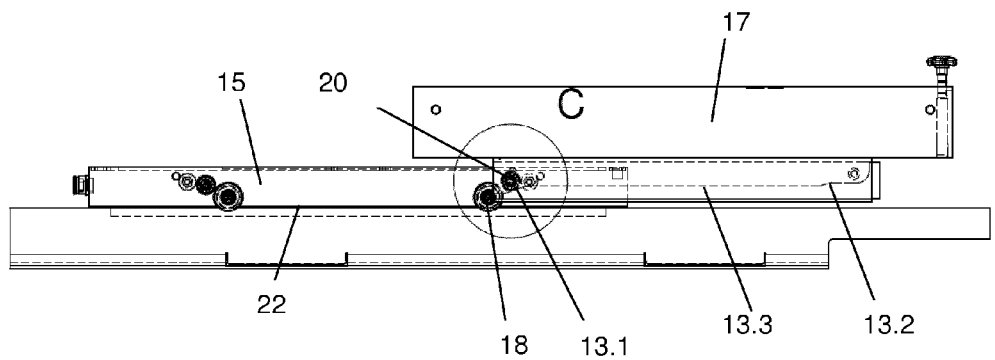
Figure 4:
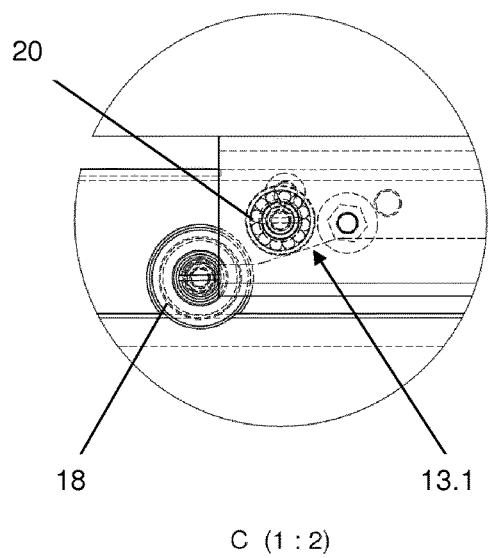

FIG. 1 shows the packaging machine 1 according to the invention, having a thermoforming station 2, a filling station 7 and a sealing station 19. A plastic sheet-material web 8, the so-called, lower web, is pulled off from a supply roll and transported from right to left, preferably cyclically, along the packaging machine according to the invention. During each cycle, the sheet-material web is transported further by one format length. For this purpose, the packaging machine has two transporting means (not illustrated), in the present case in each case two endless chains, which are arranged or the right and left of the sheet-material web. Each endless chain has retaining means, which interact in each case the edges of the sheet-material web. Both at the start and at the end of the packaging machine, in each case at least one gearwheel is provided for each chain, the respective chain being deflected around said gearwheel. At least one of these gearwheels is driven. The gearwheels in the entry region and/or in the exit region may be connected to one another, preferably by a rigid shaft. Each transporting means has a multiplicity of clamping means, which grip the lower sheet material 8 in clamping fashion in the inlet region and transmit the movement of the transporting means to the lower sheet material 8. In the outlet region of the packaging machine, the clamping connection between the transporting means and the lower sheet material is released again. In the thermoforming station 2, which has an upper tool 3 and a lower tool 4, the latter being in the form or the pack cavity which is to be produced, the pack cavities 6 are formed in the sheet-material web 8. The lower tool 4 is arranged on a lifting table 5 which, as symbolized by the double arrow, can be adjusted vertically. Prior to each advancement of the sheet material, the lower tool 4 is lowered and then raised again. As the packaging machine continues, the pack cavities are then filled with the articles 16 in the filling station 7. In the following sealing station 19, which likewise comprises an upper tool 12 and a vertically adjustable lower tool 11, an upper sheet material is sealed onto the pack cavity. It is also the case in the sealing station that the upper tool and/or the lower tool are/is lowered and/or raised prior to, and following, each transporting step of the sheet material. It is also possible for the upper sheet material 14 to be guided in transporting means or transported by transporting chains, said transporting means then extending only from the sealing station and, possibly, downstream. Otherwise, what has been said in relation to the transporting means of the lower sheet material applies here. As the packaging machine continues, it is also the case that the completed packs are separated, this taking place by means of the cutting tool 27. The cutting tool 27, in the present case, can likewise be raised and lowered by means of a lifting device 9.

Figure 5:
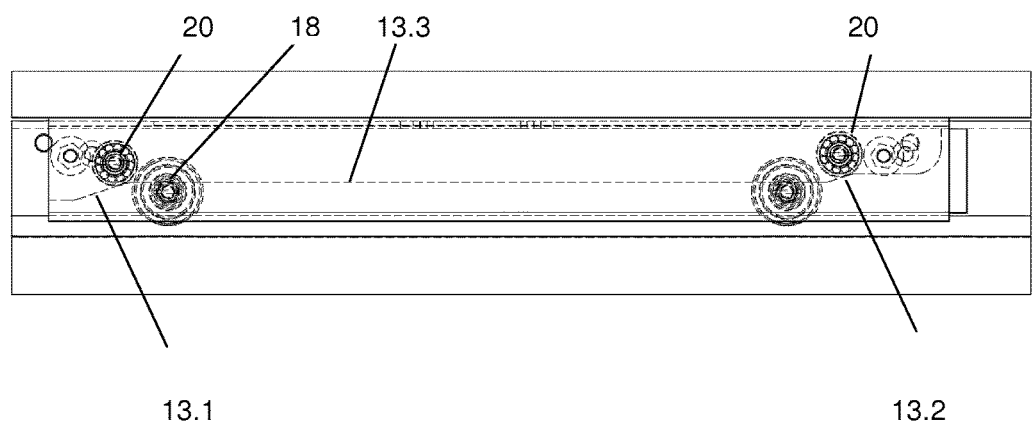
Figure 6:
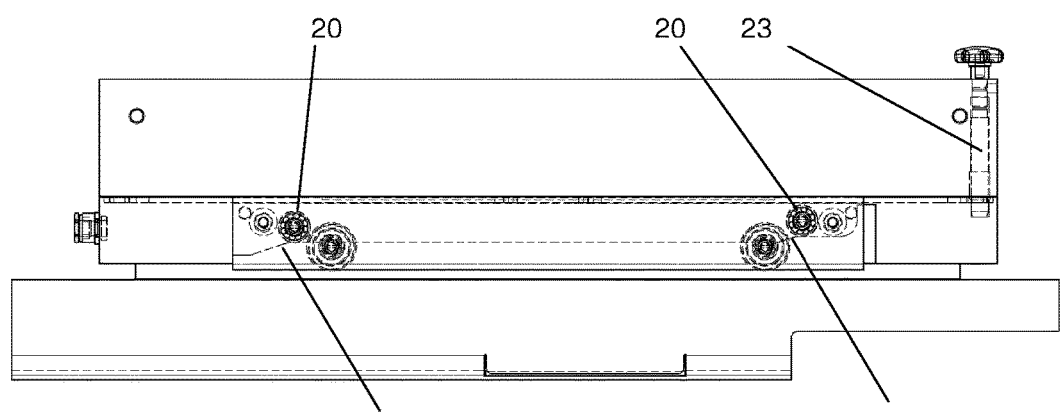
FIG. 6 shows the tool secured in the upper part.

FIGS. 2-5 show the operation of introducing the tool 15 into the upper part 17. The tool 15 has two first rollers 18, by means of which it rests on a rolling/sliding surface 22, for example the surface of the chain guide. The tool also has two second rollers 20, which are preferably located above the first rollers 18. The left-hand second roller 20 here is arranged at a lower level than the right-hand second roller 20. In the present case, the guide 13 is arranged in the upper part 17 and has a first slope 13.1 and a second slope 13.2. An essentially horizontal portion 13.3 is arranged between the slopes 13.1, 13.2. In the first instance the tool 15 is displaced to the right along the surface 22 by means of the first rollers 18, until the right-hand second roller 20 is located in the region of the first slope 13.1 or above the horizontal portion (cf. FIGS. 3 and 4). Then the right-hand second roller 20 rolls along the horizontal portion 13.3 and the left-hand first roller 18 rolls further along the surface 22 until the left-hand second roller 20 passes into the region of the first slope 13.1. At the same time, the right-hand second roller 20 is then located in the region of the second slope 13.2 (of. FIG. 5). In the case of the tool moving further to the right, the second rollers 20 rum along the first and second slopes 13.1, 13.2 and the tool 15 is raised, in which case there is only a minimal gap, if any at all, present between the upper part and the surface of the tool (of. FIG. 6). In this position, the tool is secured in a reversible manner by a securing means 23, for example a snap-action closure.

According to an alternative embodiment, the second rollers 20, rather than being aligned, are offset laterally in relation to one another, wherein the right-hand second roller 20 is preferably further away from the tool than the left-hand second roller 20, or preferably vice-versa. In the case of this example, the right-hand and the left-hand second rollers 20 are arranged on the same level. Accordingly, the guide 13 is configured such that the second slope 13.2 is arranged laterally alongside the first slope 13.1 and/or the horizontal portion 13.3. The first rollers 18 may be dispensed with in the case of this embodiment. The second rollers 20 are preferably provided such that they roll on the surface 22 and can be brought into roiling/sliding engagement with a respective slope 13.1, 13.2.

A person skilled in the art is aware that both the rollers 18, 20, the guide 13 and the surface 22 are provided in each case on opposite sides of the tool or of the upper part.

A person skilled in the art is also aware that the first and second rollers 18, 20 may be replaced, at least in part, by corresponding sliding means.

For removal purposes, the securing means is released and the tool 15 is displaced to the left.

The packaging machine according to the invention and the method according to the invention allow tool changeover to take place very quickly and/or easily. There is no need for the operating staff to raise or lower the tool.

LIST OF DESIGNATIONS

1 Packaging machine
2 Thermoforming station
3 Upper tool of the thermoforming station
4 Lower tool of the thermoforming station
5 Lifting table, carrier of a tool of the sealing station, thermoforming station and/or of the cutting device
6 Pack cavity
7 Filling station
8 Lower-sheet-material web
9 Lifting device
10 Bearing means
11 Lower tool of the sealing station
12 Upper tool of the sealing station
13 Guide
13.1 First slope
13.2 Second slope
13.3 Horizontal portion
14 Upper sheet material
15 Tool
16 Article
17 Upper part
18 First rolling or sliding means
19 Sealing station
20 Second roiling or sliding means
21 Toggle system
22 Rolling or sliding surface
23 Securing means
24 Inlet region
25 . . .
26 . . .
27 Cutting device

What is claimed is:

1. A packaging machine having:
a thermoforming station,
a sealing station, and/or
a cutting device,
wherein at least one of the thermoforming station, the sealing station, or the cutting device has a tool and an upper part and the tool can be fastened in a reversible manner on the upper part;
wherein the tool or the upper part has a guide, along which the tool can be introduced into the upper part in a first instance essentially horizontally and which then raises the tool;
wherein the guide has a first inclined slope, a second inclined slope, and a horizontal portion located therebetween; and
wherein the first and the second slopes are aligned or offset.

2. The packaging machine as claimed in claim 1, wherein the tool has at least one first rolling or sliding means.

3. The packaging machine as claimed in claim 2 wherein a second rolling or sliding means interact with the guide.

4. The packaging machine as claimed in claim 2, wherein the packaging machine has a first rolling or sliding surface, along which the tool can be displaced.

5. The packaging machine as claimed in claim 4, wherein a second rolling or sliding means interact with the guide.

6. The packaging machine as claimed in claim 4, wherein the first rolling or sliding means interact with the rolling or sliding surface.

7. The packaging machine as claimed in claim 2, wherein the first rolling or sliding means interact with the rolling or sliding surface.

8. The packaging machine as claimed in claim 7, wherein a second rolling or sliding means interact with the guide.

9. The packaging machine as claimed in claim 1, wherein the tool has at least one first rolling or sliding means and at least one second rolling or sliding means.

* * * * *